March 10, 1942.    D. SCARAMUCCI    2,275,473
WELL CEMENTING APPARATUS
Filed July 11, 1939    2 Sheets-Sheet 2
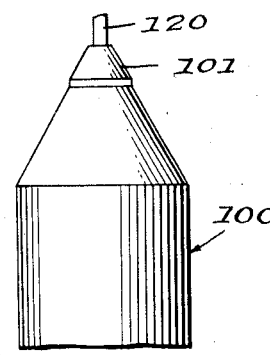
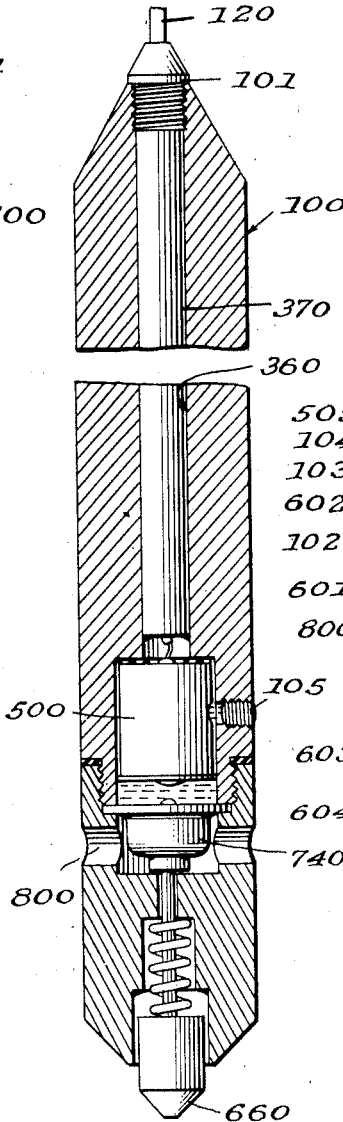
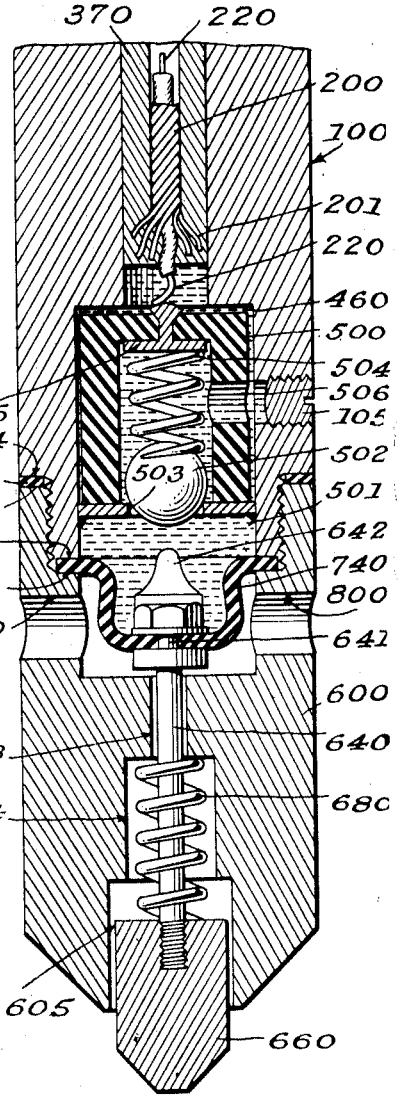
Inventor
Domer Scaramucci
By Leech + Radue
Attorneys Patented Mar. 10, 1942

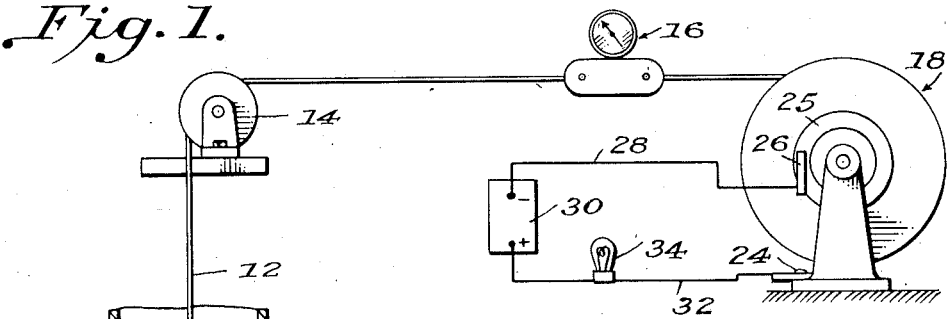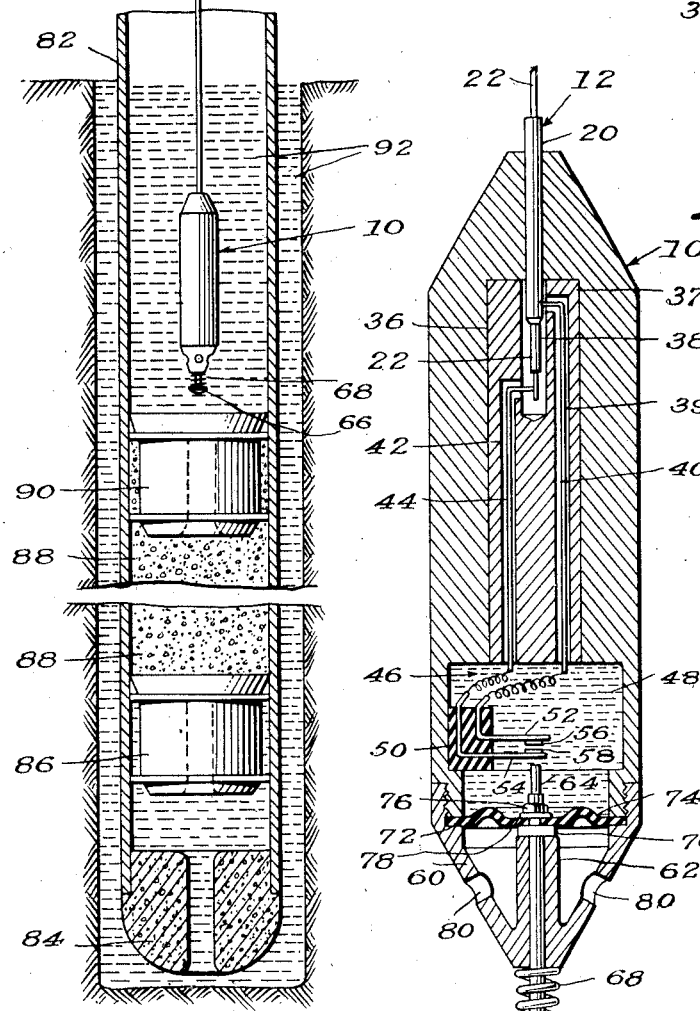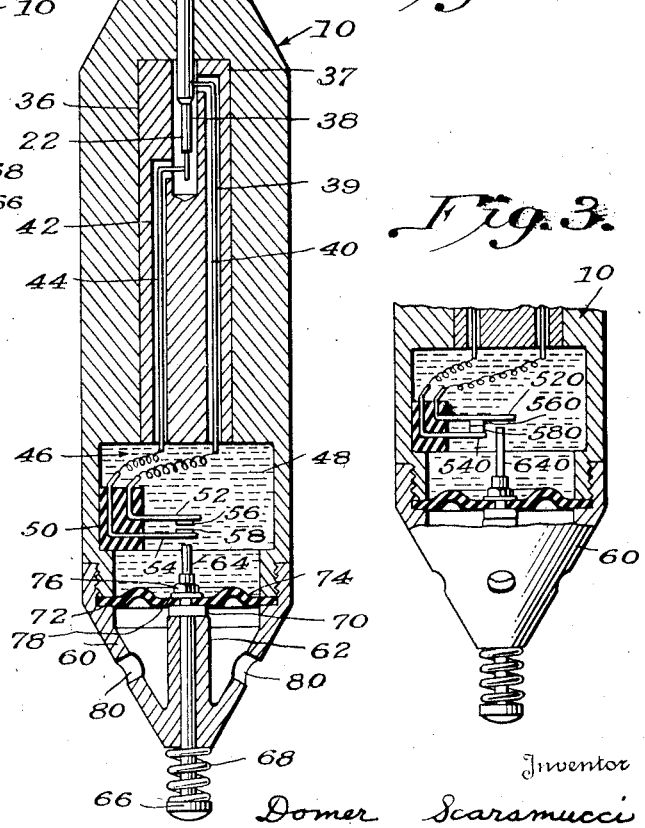

2,275,473

UNITED STATES PATENT OFFICE 2,275,473

WELL CEMENTING APPARATUS

Domer Scaramucci, Norman, Okla., assignor to Oil Equipment Engineering Corporation, Oklahoma City, Okla., a corporation of Oklahoma Application July 11, 1939, Serial No. 283,878

6 Claims. (Cl. 33—126.5)

This invention relates to a measuring apparatus for determining the depth of oil wells or the like, and more particularly to a means for determining accurately the position of an object in a well.

In the present method of sounding by the use of a simple measuring line, the operator must feel the line to determine the instant the sounding weight strikes bottom or an object in a well. The practice of this method of operating the line has been found tedious and inaccurate, especially in deep wells filled with viscous fluid which tends to deaden any sensation to be detected by feeling the line.

When a measuring line is used in the cementing of wells, cement is forced into the well casing between two plug members, the upper plug being immediately followed with the sounding weight attached to the measuring line. The operator by alternately raising and lowering the weight on the upper plug is ordinarily able to detect the plug by the feel or difference in weight, but with the increase in the depth of wells, and with an increase in the viscosity of the drilling fluid, the present practice of locating the plug becomes increasingly haphazard.

Therefore it is an object of the invention to provide means for accurately sounding wells in which excessive line friction is encountered such as exists in crooked wells, wells drilled to a great depth, and wells containing viscous fluid.

It is another object of the present invention to provide a means of transmitting signals to the surface to denote the depth at which a sounding weight has encountered an object in the well.

A further object of the invention is to provide an accurate means of sounding for a cementing plug in the well casing by electrically transmitting a signal to the surface which will positively indicate the position of the plug.

The preceding and other features and advantages of the invention will be better understood and appreciated from a reading of the following detailed description of a specific embodiment and two modifications thereof in connection with the accompanying drawings, in which Fig. 1 is a view, partly in longitudinal section and partly in schematic elevation of the apparatus set up for operation and an oil well;

Fig. 2 is an enlarged longitudinal cross section of the sounding weight;

Fig. 3 is a similar but fragmentary longitudinal section of a modified form of sounding weight;

Fig. 4 is a side elevation showing a further modification of weight;

Fig. 5 is a longitudinal section of the weight of Fig. 4; and

Fig. 6 is an enlarged and fragmentary longitudinal section of the same weight.

In the illustrated embodiment 10 indicates a sounding weight of brass which is suspended from a small cable or weight line 12 running over a guide pulley 14. The guide means provided by the pulley 14 is located at the head of the well for feeding the line 12 thereinto (Fig. 1). From the guide pulley 14, the line 12 may be extended horizontally through a linear measuring device 16, which is shown as having conventional form and means for visual indication. The line is then passed to a winding reel 18.

Fig. 2 shows the composite nature of the weight line 12, which comprises a hollow outer conductor 20 surrounding an insulated core conductor 22. The outer conductor 20 may be of steel; it is arranged on the winding reel 18 so as to be grounded to a base connector 24 thereof. A contact ring 25 and connector 26 provide a continuous electrical path from the end of the inner conductor 22 through a conducting lead 28 to a source of current 30, illustratively shown as a storage battery. The connector 24 is joined to the opposite side of the current source 30 by another conducting lead 32. An indicator of current flow in the circuit thus defined may be provided by inserting an electric lamp 34 in the lead or line 32. Other means suitable for this purpose will be obvious to those skilled in the art.

As shown best in Fig. 2, the weight 10 is preferably of cylindrical form with frusto-conical ends. The line 12 extends axially through the upper end of said weight 10 until it reaches a cylindrical bore 36 which is filled with a complemental plug 37 of insulating material such as hard rubber. A passageway 39 extends longitudinally of insulated plug 37 and houses a wire 40 connected to the outer conductor 20. Similarly, a bore 42 extends longitudinally of plug 37 and carries a wire 44 connected to the bore end of the core conductor 22.

Below the bore 36 and the plug 37 there extends a concentric cylindrical chamber 46 of larger diameter and filled with an insulating fluid such as oil 48, for purposes to be described. A block of insulating material 50 is rigidly supported in the bottom of chamber 46 at one side, in the manner clearly shown. Wire 40 leads to a resilient conductor strip 52, and wire 44 leads to a spaced and similar strip 54, both conductor strips being carried by block 50. The free ends of strips 52 and 54 are spaced and parallel with opposed contact points 56 and 58, respectively.

In the manner shown in Figs. 2 and 3, a lower frusto-conical end 60 is threadedly retained in assembled relation with the main body of the weight 10. The end 60 also is of suitable corrosion resisting metal, such as brass, and is hollow with an inwardly-extending, concentric sleeve member 62. A pin 64 has a loose, sliding fit in the sleeve member 62 and extends beyond the upper and lower ends thereof. At the lower end of the pin 64, a head 66 provides bearing for a compression spring 68 which engages the lower extremity of the frusto-conical end 60. To limit the downward movement of the pin 64, a stop in the form of collar 70 is affixed near its upper end.

An inner shoulder or flange 72 on the detachable end member 60 is used to clamp peripherally a loose rubber diaphragm 74 across the lower end of the oil-filled chamber 46. Pin 64 extends upwardly through diaphragm 74 in a leak-proof manner by reason of the clamping action of the collar 70 and a nut 76 and washer 78.

Note is taken at this point of the four openings 80 in the sides of the frusto-conical end 60, which openings permit fluid to enter and balance the pressure on the upper side of the loosely extending, flexible diaphragm 74.

In view of the fact that the contact points 56 and 58 and the upper end of pin 64 are all in alignment, sufficient upward movement of the pin 64 will move the points into circuit-closing relation.

The modified construction of Fig. 3 differs from that previously described only in its arrangement of contact strips 520 and 540 which have their respective contact points 540 and 560 in springpressed contact, except when they are separated by the lifting action of pin 640 on the uppermost strip 520.

The operation of the apparatus of this invention will now be described in its relation to the cementing of an oil well. As seen in Fig. 1, the well comprises a casing 82 having a guide shoe 84 of conventional form at the bottom. A lower cementing plug 86 is inserted in casing 82, a body of cement slurry 88 pumped into the casing above plug 86, and an upper cementing plug 90 moved into engagement with the top boundary of cement 88. By applying pressure to the well fluid 92 above the plug 90, the two plugs 86, 90 and the cement slurry 88 will be forced downwardly of the casing 12 until the bottom plug 86 engages the guide shoe 84 and is ruptured to permit the slurry to pass through said shoe 84 and upwardly between the casing 12 and the bore formation for the desired distance. Other familiar forms of bottom cementing plugs may be used, for example, the expanding type described in Halliburton Patent No. 1,369,891.

In deep wells, the nature of the unset cement requires the utmost speed in pumping, which increases the difficulty and inaccuracy of sounding for the top cement plug with an ordinary sounding weight and line. The accurate placing of the cement, it will be appreciated, depends upon an exact knowledge of the location of the top plug 90, since that knowledge determines the time at which pumping of the well fluid 92 into the casing 12 should cease. With the apparatus of this invention a definite indication of the position of top plug 90 is obtained every time the pin 64 or 640 engages said plug and is moved upwardly relatively to the body of sounding weight 10 to make or break the electric circuit of the lamp 34 and a reading taken on the linear measuring device 16.

Great sensitivity is obtained by compensating for the effects of a pressure head of fluid on the pin head 66 with the diaphragm 74 and fluid-filled chamber 48. As the pressure on head 66, and the lower side of the diaphragm 74 increases, the upward displacement of the diaphragm, as seen in Figs. 2 and 3 will increase the reactive pressure in chamber 48.

The association of a pressure-balanced chamber enclosing electric switching means with a sounding weight is broadly novel and represents one of the separately useful subcombinations of the instant invention.

A somewhat different form of sounding weight and pressure-balanced electrical switch are illustrated in Figs. 4, 5 and 6.

In Fig. 4, a corresponding metallic sounding weight is indicated generally by the reference numeral 100. The weight 100 has an axial cylindrical bore 360 extending from its upper end, as seen in Fig. 5. In the bottom portion of the weight 100, the bore 360 opens into an enlarged cylindrical bore 460 which provides a switch chamber that will be described in more detail.

Like the weights shown in Figs. 1, 2 and 3, weight 100 is suspended at its upper extremity from a weight line 120 formed of two separate conductors, 201 and 220, in the manner shown by Fig. 6. The outermost conductor 200 is formed of braided or twisted steel wire and has its ends 201 embedded in an alloy core 370 which is poured into the bore 360. An alloy consisting of one half tin and one half lead has been found suitable for this purpose. The inner conductor 220 may be of copper and is, of course, insulated from the steel wire 200. A bushing 101 is threaded into the upper end of the bore 360 on top of the core 370, in the manner of Fig. 5.

An insulating block 500 of inverted cup-shape fills the upper end of the chamber 460, and is supported at its lower edge by a thin brass plate 501 upon the upper side of which rests a brass ball member 502 somewhat larger in diameter than a circular, central aperture 503 in said plate. A coiled brass compression spring 504 provides resilient means for preventing a displacement of the ball member 502 from engagement with the apertured plate 501. The path of electrical conduction from the ball member 502 is continued by a contact member 505 of collar button shape, which extends through the upper end of the insulating block 500. That is, the head of the contact member 505 is connected to the inner conductor 220 on the topside of the block 500, and has the spring 504 continually abutting its inner end within said block. A lateral bore 506 in the block 500 permits the chamber 460 to be filled with an insulating fluid 507, such as oil, through an aligned tap 105 in the weight 100.

A flat, circular face 102 constitutes the lower extremity of the weight 100 and serves to clamp a flexible diaphragm 740 against an opposed face 601 within the upper part of the frusto-conical end 600, which is threaded onto said weight 100. The diaphragm 740 is somewhat cup-shaped, and may be fashioned from rubber-like material. An additional sealing between the end 600 and weight 100 is supplied by a washer 103 which is clamped between a shoulder 104 on the weight 100 and an opposite face 602 on the end 600.

Progressively enlarged counterbores 603, 604 and 605 extend along the longitudinal axis of the conical end 600 below the diaphragm 704. The smallest of these bores, 603, guides a reciprocable pin member 640 having a head 660 threaded on its lower end and projecting below the frusto-conical end 600. Abutting the inner end of the head member 660 and encircling the reciprocable pin member 640, is a compression spring 680 which acts at its upper end against the top of the bore 604, as seen in Fig. 6. The reciprocable member 640 has a portion 641 of smaller diameter extending through the center of the diaphragm 740, and secured thereto by a nut 642, having a pointed head. The nut 642 clamps the underlying portion of the diaphragm 740 against a relatively large collar 700 on the member 640. It will be apparent that upward movement of the reciprocable member 640 will cause the pointed nut 642 to displace the ball member 502 from its position of bridging contact in the aperture 503 of brass plate 501. The plate member 501 is in contact with the metallic body 100.

Openings 800, of which four are shown in the weight of Figs. 4, 5 and 6, expose the lower side of the diaphragm 740 to the pressure of the fluid in which it is immersed.

The operation of the modified device illustrated in Figs. 4, 5 and 6 is similar to that of the principal form of the invention which has already been described, it being sufficient to observe that the brass ball member 502 closes the circuit between the two conductors of the line 120, except when it is unseated by sufficient upward movement of the reciprocable member 640 upon engagement of the head 660 with some solid object.

Having thus described my invention, what I claim as new and desire to secure by Letters Patent of the United States is:

1. An electrical sounding device for use in liquids, which comprises a generally cylindrical weight with frusto-conical ends and provided with an internal chamber, a rubber diaphragm closing the chamber, a body of non-conducting liquid filling said chamber, said weight being provided with an opening for exposing the diaphragm to the pressure of a liquid in which it is immersed, a switch having spaceable contacts within said chamber, slidable pin means secured to and extending through the diaphragm and arranged to operate the switch, said pin means having a head portion projecting outwardly of the weight, a spring between the head portion of the pin and the weight for holding said pin in an outwardly extended position, a collar on said pin arranged to engage the weight and limit outward movement of said pin, and conductors operatively connected to the switch and extending externally of the weight.

2. An electrical sounding device for use in liquids, which comprises a generally cylindrical weight provided with an internal chamber, a diaphragm closing the chamber, a body of liquid filling said chamber, said weight being provided with an opening for exposing the diaphragm to the pressure of a liquid in which it is immersed, a switch having a pair of contacts within said chamber which are normally held in resilient engagement, slidable pin means extending through and secured to the diaphragm and arranged to operate the switch separating the contacts, said pin means having a head portion projecting outwardly of the weight, and conductors operatively connected to the switch and extending externally of the weight.

3. An electrical sounding device for use in liquids, which comprises, a metallic body provided with an internal chamber; a diaphragm closing the chamber; a body of insulating fluid filling said chamber, said metallic body being provided also with an opening for exposing its diaphragm to the pressure of a liquid in which it is immersed; a switch within the chamber and including an apertured metal member connected to the metallic body and a displaceable metal member for seating upon the aperture; reciprocable pin means extending through and secured to the diaphragm and arranged to move the displaceable metal member away from the aperture, said reciprocable means projecting beyond the said metallic body; and separate conductors electrically connected to the metallic body and to the displaceable metal member, whereby to open a circuit when the last-named member is displaced by the reciprocable means.

4. An electrical sounding device for use in liquids, which comprises, a generally cylindrical metallic body provided with an internal chamber; a rubber-like diaphragm closing the chamber; a body of insulating fluid filling said chamber, said metallic body being provided also with an opening for exposing its diaphragm to the pressure of a liquid in which it is immersed; a switch within the chamber and including an apertured metal plate member connected to the metallic body and a displaceable metal ball member for seating upon the aperture; reciprocable pin means extending through and secured to the diaphragm and arranged to move the displaceable metal ball member away from the aperture, said reciprocable means projecting beyond the said metallic body; and separate conductors electrically connected to the metallic body and to the displaceable metal member, whereby to open a circuit when the last-named member is displaced by the reciprocable means.

5. An electrical sounding device for use in liquids, which comprises, a generally cylindrical metallic body provided with an internal chamber; a rubber-like diaphragm closing the chamber; a body of insulating fluid filling said chamber, said metallic body being provided also with an opening for exposing its diaphragm to the pressure of a liquid in which it is immersed; a switch within the chamber and including an apertured metal plate member connected to the metallic body and a displaceable metal ball member for seating upon the aperture; resilient means for seating the ball member in the aperture of the plate member; reciprocable pin means extending through and secured to the diaphragm and arranged to move the displaceable metal ball member away from the aperture, said reciprocable means projecting beyond the said metallic body; and separate conductors electrically connected to the metallic body and to the displaceable metal member through the resilient means, whereby to open a circuit when the last-named member is displaced by the reciprocable means.

6. In a sounding apparatus for use in oil wells or the like, the combination comprising a sounding weight provided with an internal chamber; an insulated conducting line connected to the sounding weight; a loosely extending, flexible diaphragm closing the chamber of said weight; a body of non-conducting liquid filling said chamber, said weight being provided with an opening for exposing the diaphragm to the pressure of a liquid in which it is immersed; a switch having spaceable contacts positioned within said chamber and in circuit with the conducting line; slidable pin means secured to and extending through said diaphragm and arranged to open and close said switch, said pin means having a head portion projecting outwardly of the weight; a spring between the head portion of said pin and the weight for holding the pin in an outwardly extending position; and a stop on said pin constructed and arranged to engage the weight and limit outward movement of said pin.

DOMER SCARAMUCCI.